US006293156B1

United States Patent
Shen et al.

(10) Patent No.: US 6,293,156 B1
(45) Date of Patent: Sep. 25, 2001

(54) COHERENT MULTI-PATH FLOW MEASUREMENT SYSTEM

(75) Inventors: Chang Shen, Attleboro; Saul A. Jacobson, Medford, both of MA (US)

(73) Assignee: Panametrics, Inc., Waltham, MA (US)

( * ) Notice: Subject to any disclaimer, the term of this patent is extended or adjusted under 35 U.S.C. 154(b) by 0 days.

(21) Appl. No.: 09/417,946

(22) Filed: Oct. 13, 1999

Related U.S. Application Data
(60) Provisional application No. 60/116,700, filed on Jan. 22, 1999.

(51) Int. Cl.[7] .................................. G01F 1/66; G01F 5/22
(52) U.S. Cl. ...................................... 73/861.26; 73/861.06
(58) Field of Search ............................ 73/861.27, 861.26, 73/861.25, 861.18, 861.06, 861.05

(56) References Cited

U.S. PATENT DOCUMENTS

| | | | |
|---|---|---|---|
| 4,735,097 | 4/1988 | Lynnworth | 73/861.28 |
| 4,787,252 | 11/1988 | Jacobson et al. | 73/861.28 |
| 5,437,194 | 8/1995 | Lynnworth | 73/861.27 |
| 5,792,962 | 8/1998 | Constant et al. | 73/861.04 |

Primary Examiner—Benjamin R. Fuller
Assistant Examiner—Jagdish Patel
(74) Attorney, Agent, or Firm—Nutter, McClennen & Fish, LLP (57) ABSTRACT

A clamp-on ultrasonic measurement system for a gas or fluid of low acoustic impedance, such as steam, two phase fluid or flare gas includes an ultrasonic signal transmitter which clamps to the steam or gas conduit, and first and second receiving transducers clamped in the shadow zone of the transmitter. The transmitter signal skips within the conduit wall with a characteristic skip distance $L_p$ so ultrasonic signal energy is launched across the flow along plural paths over a region, and at an angle to the direction of flow. The receivers are positioned to receive the signal energy along different ones of said paths, modulated by tags or inhomogeneities in the flowing fluid. Cross correlation of the received signals then yields a peak correlation time interval or time delay from which the flow velocity is accurately determined. The transducers preferably employ air-backed crystals to generate a continuous shear wave signal of about 100 kHz–1 MHz, which reflects within the pipe wall and transmits a portion of its energy into the fluid with each skip. A structure or material mounts with an acoustically-matched impedance coupling to the pipe between two receiver transducers to absorb or block quasi-coherent signals that have passed through the fluid and have entered and propagated along the wall, thus eliminating phantom correlation peaks in the signals received downstream. Preferably, the receiving transducers are coupled with wedges to the conduit along a length $nL_p$, and have an actual diameter less than $L_p$ or are otherwise configured to receive energy along a spatially limited path spread with high sensitivity to small scatterers in the fluid path. In a second aspect of the invention, a system employs two transmitters at different frequencies, opposed to a corresponding pair of similarly-spaced receivers. The receiver outputs are demodulated at the separate frequencies and then correlated to determine the flow time between receiving stations.

11 Claims, 10 Drawing Sheets

*FIG. 11D*

COHERENT MULTI-PATH FLOW MEASUREMENT SYSTEM

CROSS-REFERENCE TO RELATED APPLICATIONS

This application is related to U.S. Provisional Patent Application Ser. No. 60/116,700, filed Jan. 22, 1999 of which the priority is hereby claimed.

FIELD OF THE INVENTION

The present invention is related to flow measurement, and in particular to ultrasonic flow measurement wherein a fluid flowing in a conduit is measured by transmitting ultrasonic waves into or across the flowing stream. Such measurement systems are widely used in process control and other situations where fluid measurement is required. In general the constraints involved in setting up any such system involve generating appropriate ultrasonic signals, coupling them into the fluid, receiving the signals after they have traveled through the fluid, and processing them to determine a parameter of interest such as flow-rate, fluid density or the like. Measurement by ultrasonic signals offer several advantages, among which are the possibility of performing the measurement without intruding into the fluid or its container or causing a pressure drop in the fluid line. When the situation permits the use of a transducer clamped to the outside so that no special machining is needed, then the further advantages of simple installation, low maintenance cost and portability may be obtained.

However, there are many trade-offs in configuring an ultrasonic fluid measurement system. Generally, the conduit or vessel wall carries noise and may also constitute a significant short circuit noise path between transducers. Further, when the fluid is a gas, the gas carries relatively little signal energy compared to that in the pipe wall, and the acoustic impedance mismatch may result in passage of an extremely weak signal, possibly along an inconveniently refracted path angle which may drift with changing parameters, making detection or reception difficult or impossible. Furthermore, when the desired measurand is the flow velocity, relatively high frequencies may be needed to obtain sufficient resolution, and these in turn may be subject to relatively strong scattering fluctuations from turbulence or scatterers in the fluid or solid path.

The foregoing factors have generally prevented the design of an economic and effective ultrasonic flow measurement system for gas or steam in pipes, particularly in steel pipes. Currently, steam flows are measurable only with wetted transducers fitted in a special spool piece. To fit a measurement system to a plant therefore entails a cumbersome and expensive procedure involving shutting down the steam line, cutting the line and fitting a spool piece or custom mount. This entails enormous costs. Thus, while wetted transducers adjacent to the free stream may be implemented with special installation or custom spool pieces, it would appear that substantial improvements in attainable signal quality will be required before an effective external measurement system can be devised for flowing steam, particularly at relatively low pressures, e.g., under 35 psia (20 psig).

It would therefore be desirable to develop an improved ultrasonic system for measuring the flow of steam or gas.

It would further be desirable to develop an ultrasonic system which conveniently clamps onto a steam or gas conduit without special tapping, cutting or machining operations, and which is capable of launching and receiving signals from which a flow measurement is accurately determined.

SUMMARY OF THE INVENTION

The present invention achieves one or more of the foregoing objects by energizing a region of a steam or gas conduit with one, or in some embodiments more than one, clamp-on ultrasonic signal transmitter coupled or attached to the conduit, and providing two or more receiving transducers which clamp onto the conduit away from the transmitter region and are positioned to receive signals along paths through the flowing fluid from the energized region. The ultrasonic signals in the pipe which are transmitted across the fluid to the receivers are modulated by inhomogeneities traveling with the fluid in the conduit, and the receiving transducers are positioned such that each receiving transducer receives signal energy that has crossed a different, but spatially well-defined path, and are spaced such that the two received signals may be cross-correlated to accurately determine the flow time between the two receiving positions. Preferably the transmitter operates in a continuous wave mode, and provides a beam which refracts at a high incident angle into the pipe wall to produce multiple internal reflections along one side of the conduit. The main energy of the transmitted sound propagates along the pipe wall with the incident angle, leaving a shadow zone or quiet region of the conduit, where the receivers are installed. The transducer may be an air backed crystal effective to transfer the desired wave mode, preferably a vertically polarized shear wave signal at a frequency between about 100 kHz and 1 MHz, to the pipe wall, permitting the signal to propagate through the gas or steam without excessive attenuation. The diameter of the receiving transducers is preferably small, under about two centimeters such that they are sensitive to anomalies or discontinuities of small size in the flowing fluid.

Applicant contemplates two aspects of the invention. In the first aspect a transmitter may provide a single-frequency signal at frequency $f_0$ that refracts into the conduit wall producing multiple internal reflections along one side of the conduit. In this case two separate receiving transducers receive signal energy that has passed through the fluid along separate paths. In a second aspect, a system of the present invention may employ two transmitters at different frequencies, with each signal received and demodulated separately.

In the single frequency system, the spacing L, of the receiving transducers is less than the skip distance $L_p$ of a single path reflection of the transmitted signal in the conduit wall. When signal quality or quiet background conditions permit, the receiver spacing may be set larger than, but an integral multiple of $L_p$, in which case a peak absorber structure, which may, for example, be fabricated of steel or stainless steel, is preferably coupled to the conduit wall between receiving transducers to couple out fluid-borne energy which has entered the steel pipe wall upstream. This effectively blocks the more highly correlated components of short circuit signal energy from contributing to the downstream receiver's reception signal of the energy received along a direct path through the fluid to the downstream receiver, thus effectively decoupling the signals received at each receiver and preventing the occurrence of false correlation peaks.

In a system according to the second aspect of the invention, when two transmission signals are launched from separate regions and at different frequencies $f_0$, $f_1$, two separate receiving transducers are spaced to receive the transmission signals at the frequencies $f_0$, $f_1$ respectively after traveling through the fluid. The two frequencies $f_0$, $f_1$ are selected to be comparable, e.g., to be close enough to each other that noise from the moving fluid modulates both signals similarly. Further, the spacing L between the two receiving transducers is set to be identical to the spacing between the two transmitting transducers. This distance L is further restricted by the consideration that the fluid paths defined between the respective transmitter-receiver pairs are to be sufficiently close that the noise modulation of the two received signals is highly correlated. This noise-coherence distance varies with flow velocity and conduit diameter, but L may typically be a spacing of one to three pipe diameters.

Preferably the signal from each transducer passes through a band-pass filter with center frequency at the transmission frequency, and is quadrature demodulated to produce a detection signal of enhanced signal to noise ratio; this signal is cross-correlated with the signal from the other receiver to determine the correlation peak or time delay between the two received signals. The transducers may be coupled to the conduit via a plastic wedge to mode convert the transducer energy to a shear wave signal, or may be coupled via a stainless steel wedge configured to present a defined launch angle into the conduit. The launch angle is set so that the shear wave reflects internally in the conduit to energize a region of the pipe wall, and in the single-frequency embodiment results in signal coupled into the flowing fluid at plural distinct points where the wall-borne signal reflects internally in the conduit wall. The signal passes obliquely across the fluid at an angle with respect to the normal which is effective, in the presence of flow, to introduce a Doppler spreading of the signal spectral energy so that, as compared to prior art tag systems employing normal paths, a substantially increased signal level is recoverable by quadrature demodulation of the received signals.

Preferably the transducer crystals are all shielded within metal cases or enclosures to prevent electromagnetic noise from degrading their output signals. The transducers may be coupled by Lucite or Torlon wedges, or by steel buffer rod assemblies. The side surfaces of the wedge or buffer may have ripples or teeth to dampen reverberation and enhance faithful transmission of the signal to the conduit, and/or when a buffer rod is used, it may employ a separate shoe having a curved coupling surface to enhance coherent coupling to the pipe and reduce the ring-down time of the steel wedge. In further embodiments multiple receivers are spaced at defined intervals along the receiving side of the conduit in the downstream direction, and a selector selects a pair of receivers based on the current quality of the received signals and the spacing necessary to achieve the desired level of measurement resolution. The processor may also combine signals or data from multiple receivers of a receiver array to produce a correlation set of greater information content and enhance the time resolution or response. In another embodiment, the transmitting and receiving transducers are located on the same side of the conduit and receive energy along transit paths having an odd number of reflections from the conduit wall between transmission and reception. The invention also contemplates clamp-on systems with multiple transmitting transducers.

BRIEF DESCRIPTION OF THE DRAWINGS

These and other features of the invention will be understood from the description below taken in connection with the figures illustrating representative embodiments thereof, wherein.

DETAILED DESCRIPTION OF THE INVENTION

Figure 1:
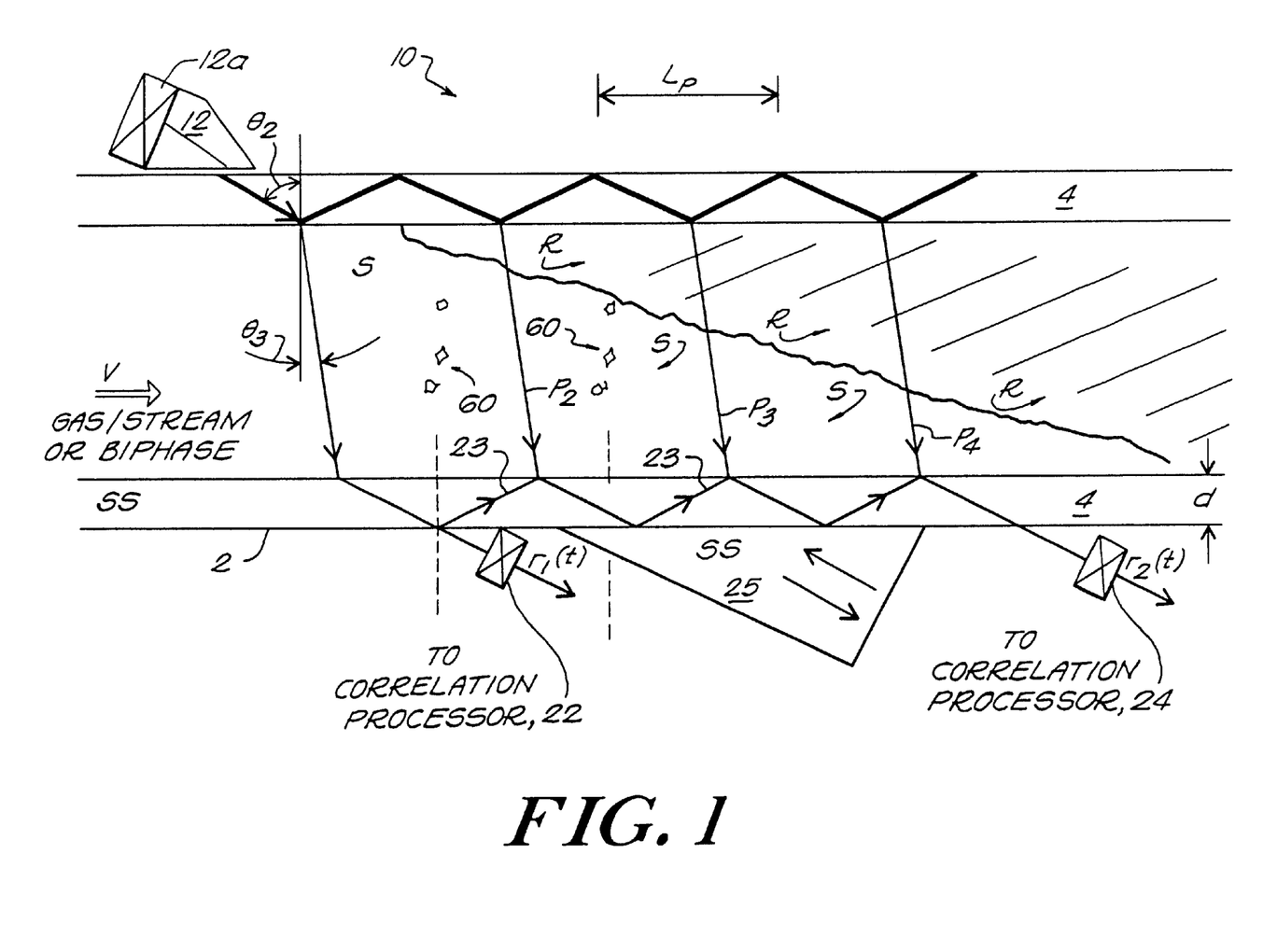
FIG. 1 illustrates a first embodiment of the invention.

FIG. 1 shows an exemplary embodiment of a measurement system 10 in accordance with the basic embodiment of the present invention for measuring the flow of steam in a conduit 2. As shown, the conduit 2 has a wall 4 with a thickness "d" which may for example be on the order of one centimeter. As noted above, a problem in measuring a flowing gas or fluid such as steam at low pressure or temperature is that the conduit itself may be quite noisy, carrying random mechanical noise and transmitter-generated coherent noise ("crosstalk") to the receiving transducer(s). Further contributing to the difficulty of measurements, the gas or steam has a very low density so that very little signal can be coupled into and transmitted through it, or be detected above the level of background noise.

By way of overview, the present invention addresses these limitations by arranging system components to provide tag-correlatable fluid paths of enhanced signal level and low noise level. As shown in FIG. 1, in accordance with a first aspect of the invention an emitting transducer 12 has a crystal 12a or other ultrasonic wave generator which preferably generates a longitudinal or shear wave that propagates along a path at an angle $\theta_1$ and is transmitted as a shear wave into the conduit wall. The transmitted wave refracts to an angle $\theta_2$ and undergoes internal reflections which propagate along the wall with a skip distance $L_p$ between successive reflections at each surface. The angle $\theta_2$ is relatively steep e.g. about seventy degrees, which is selected to enhance internal reflection and to launch a compressional wave signal at a defined oblique angle across the fluid in the conduit. Preferably the transducer operates in a continuous wave mode so that a region of the wall 4 is efficiently energized economically to emit ultrasonic energy into the fluid flowing in the conduit. The portion transmitted into the fluid has a refracted path angle $\theta_3$ with respect to the normal. On the other side of conduit 2, a pair of receiving transducers 22, 24 are clamped onto the outside of the conduit, spaced at a defined separation L, to each receive energy which has traveled through the fluid and through the opposing conduit wall. Preferably $L=nL_p$, where n is integer. By way of illustration, a plurality of scatterers 60 are shown carried in the fluid flow.

As illustrated by the oblique mounting of the crystals, each transducer includes, or is part of an assembly which includes a mounting block, wedge, shear wave buffer rod or similar arrangement for coupling energy between the crystal and the pipe so that the energy enters the pipe wall as shear wave energy at a defined angle. Furthermore, each of the receiving transducers 22, 24 has an effective diameter less than the distance $L_p$ so that it effectively receives energy that has traveled through the fluid along a localized transit path p1, p2 . . . of the skipping conduit wall signal from the other side. As further shown in FIG. 1, on the receiving side of the conduit, a blocking material or structure 25 is attached to the conduit between the receivers 22, 24 to absorb coherent energy traveling in the pipe wall, such as schematically-illustrated internal reflection 23. The blocker 25 is especially useful when the receiving transducer spacing L is greater than or equal to 2 $L_p$.

In accordance with a principal aspect of the present invention, the energy transmitted through the fluid and received by separate receivers 22, 24 is passively modulated by scatterers present in the fluid flowing in the conduit so as to acquire a signature at each instant in time characteristic of the inhomogeneities through which the received signal has passed. That is, the fluid itself, with its turbulence, droplets and other inhomogeneities, passively provides tags. These tags are assumed to move with the flow stream, and with a substantially uniform velocity profile, so that the tags present in the flow path at a position $x_0$ at time t=0 will be located at a position $x_0+Vt_1$ at time $t_1$, where V is the velocity of the gas or steam in the conduit. The presence of substantially identical tags in the flow at two distinct places is detected by cross-correlation of the two received signals to determine a time interval $\tau$ indicative of the time taken for fluid to flow the distance L separating the two reception paths.

As described more fully in regard to FIG. 2, below, this is done by sampling the signal from a first receiver over a time interval, and then taking a plurality of successive sample intervals of the downstream received signal, and correlating each of the samples with the upstream received signal interval to find a peak correlation time. Implementation of one suitable microprocessor-controlled signal correlation processor is described more fully in commonly-owned U.S. Pat. No. 4,787,252. In the present application to steam or low density fluid flow, a blocking material or structure 25 is preferably also placed on the conduit wall between the receivers. This prevents the upstream signal which has crossed the flow stream and entered the pipe wall from traveling in the conduit wall and exiting the downstream receiver, where it would introduce a signal similar to, but temporally offset from, the fluid-borne signal which has traveled along path $p_2$.

As further shown in the embodiment of FIG. 1, the transmitter 12 is mounted to direct the signal along a general axially downward direction, so that its energy field propagating in the conduit wall follows a path generally to the right and circumferentially downward to form a disturbed, noisy or ringing zone R in the pipe, and a complementary quieter, or shadow zone, denoted generally by S. As illustrated, the receivers 22, 24 are positioned in the shadow zone S of the transmitter, which in this configuration extends several skip-lengths downstream along the opposite side of the conduit. Thus, although it may generally be said that the signal level traveling in the conduit will be much greater than the level of signal effectively coupled into and back out of the low density fluid in the conduit, this conduit or short circuit noise level is reduced greatly by positioning the receivers in the transmitter shadow; here, substantially across from the transmitted beams.

In general, the frequency of the transmitted signal is taken to be sufficiently high, in the range of about 100 kHz to 1 MHZ, that modulation of the signal by the flowing fluid is moderate; so that the wavelength $\lambda$ in the pipe wall is small compared to the thickness of the pipe wall; and so that the spatiotemporal resolution of the paths and timing will be adequate to distinguish the expected flow velocities, for example in the range of one to one hundred meters per second. By way of example, in a steel pipe having a wall thickness of 7–8 millimeters, a 500 kHz signal with a shear wavelength of six millimeters may be used, resulting in a skip length $L_p$ of about four centimeters with $\theta_2=70°$. The signal is suitably launched with a transmitter and wedge arrangement having a contact line of about two centimeters; receivers having about half that diameter are placed on the opposite side using similar clamp-on mounting blocks.

The signal passing through the fluid is broadened by Doppler interaction with the flow to produce a received signal having a somewhat wider frequency spread than the original transmitted signal. A preferred system of the present invention advantageously recovers an enhanced portion of this received signal energy by quadrature demodulation of the receiving transducer output prior to the correlation processing.

Figure 2:
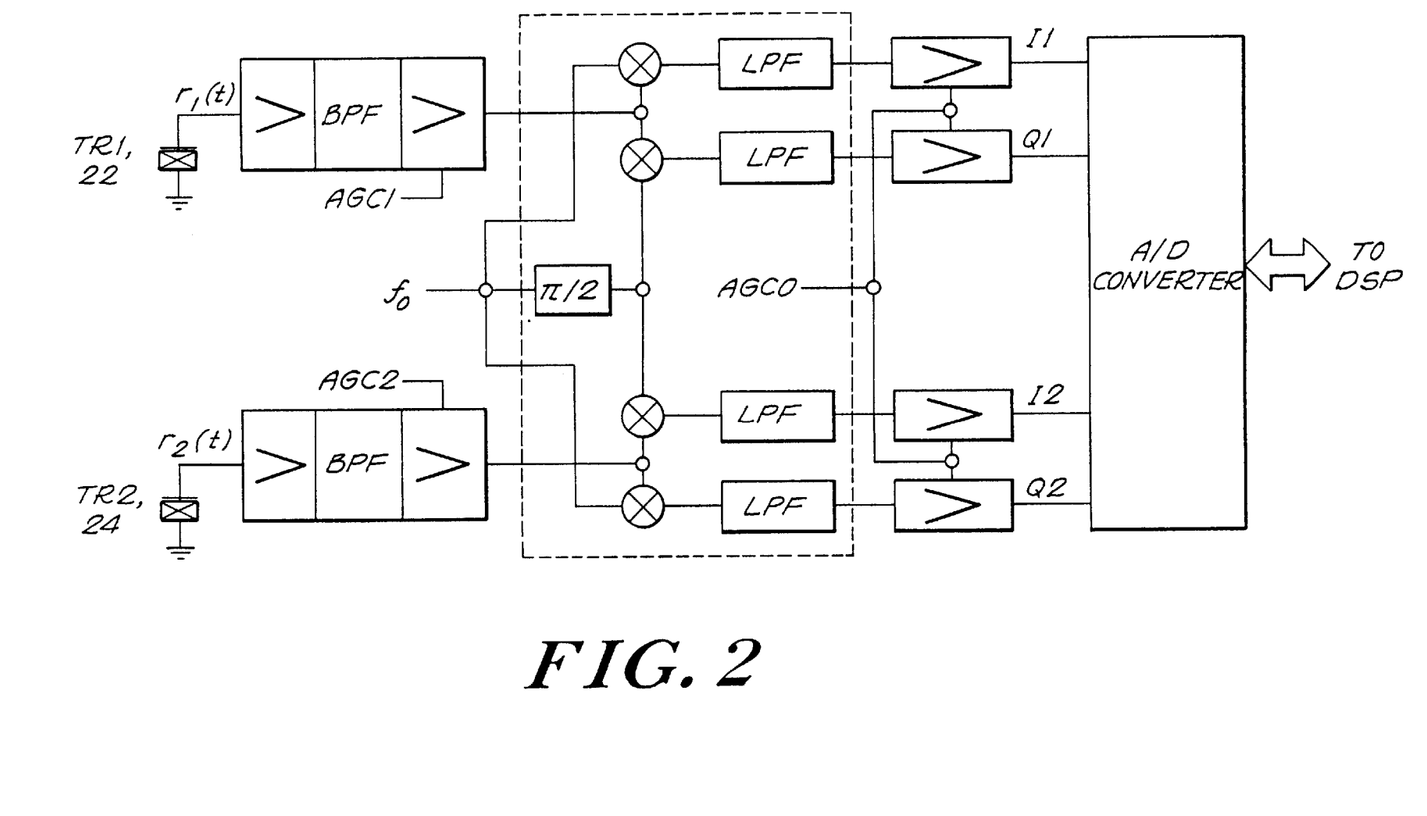
FIG. 2 illustrates signal processing.

FIG. 2 illustrates processing for the signals received in the two receivers. As shown, each reception signal passes through a bandpass filter centered near the transmission frequency, is amplified and is split into two portions which pass to separate multipliers where the signal is quadrature demodulated at the center frequency $f_0$. Its components are then low pass filtered, further amplified and digitized to produce a digital output signal. The I,Q components pass to a digital signal processor DSP, which illustratively, squares and sums the components to produce a digital output indicative of the amplitude of the received signal envelope. The signals from the two channels are then correlated. As noted above, the Doppler expansion of the transmitted signal results in a larger energy being present in the received signal, and the quadrature demodulation effectively extracts the energy from the full band to produce a greater output signal from the receiver. This added signal energy enhances the time resolution which may be achieved with the received signals. Furthermore, by using a relatively steep launch angle, the transmitted signal is more effectively modulated because of the beam sweeping in a turbulent flow, so that a stronger modulation is obtained than would occur with a fluid transit path at normal incidence, i.e. $\theta_2=0°$. Furthermore, the phase information present in each channel may also be recovered in the DSP as the arctangent of (Q/I) for each channel, and the processor may use the scattering fluctuation it represents to control the processing algorithm, signal regimen, or transducer selection as discussed further below.

Figure 3:
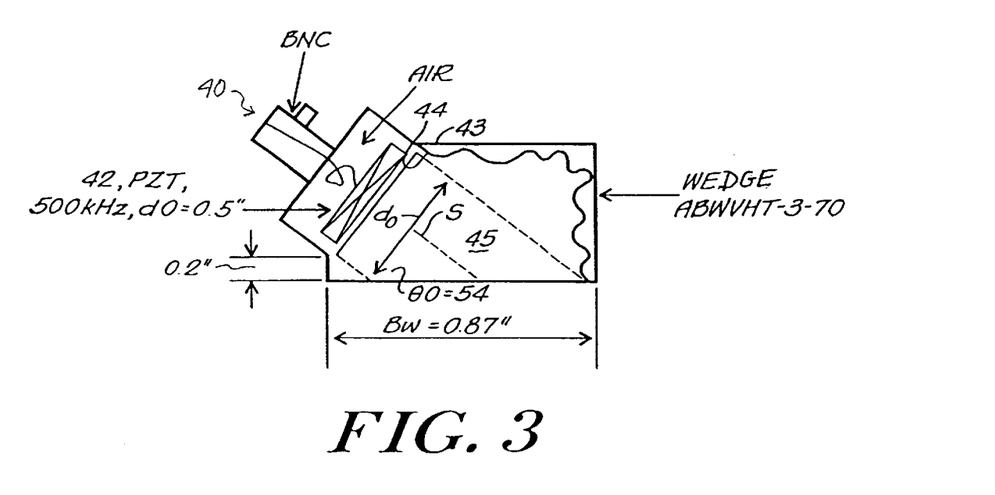
FIG. 3 illustrate a suitable transducer construction.

FIG. 3 illustrates a suitable construction for a transducer 40 for the practice of the present invention. A PZT crystal 42 is grounded on one side by a 0.001" stainless steel disk 43, through which it couples, via a quarter wave matching plate 44 to a clamping wedge or mounting block 45 to launch its signal s into or receive a signal from, the conduit. The other side of the crystal is air-backed, maximizing energy transmission in the forward direction. Electrode connections and electromagnetic shielding may be of conventional type and are not illustrated further. The undamped construction is particularly appropriate for continuous wave CW operation and, as described above, the small dimension of the receiving transducers allows the transducers to respond to fluctuations from small tags in the fluid stream, enhancing resolution. The wedge material may be Lucite for gas applications, and a material such as Torlon for low temperature steam applications.

Figure 4:
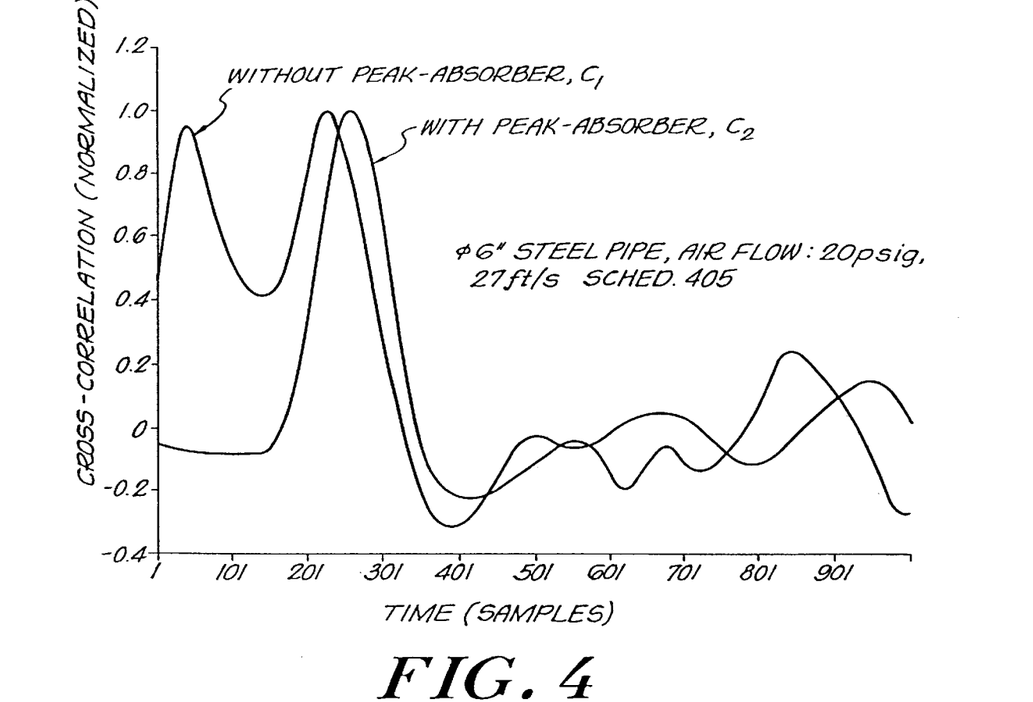
FIG. 4 illustrates cross-correlation results with and without a peak absorber placed between receivers.

Applicant has further found that it is desirable to remove or greatly attenuate the portion of the fluid-borne signals which has entered the distal (or receiver-side) conduit wall so that it does not travel further along the wall to excite the second or later receiving transducer and produce a false correlation peak with the similar signal $P_1$, $P_2$ or $P_3$ of FIG. 1, earlier received by the first or upstream receiving transducer. This is may be done by applying a coupling grease, such as a shear wave coupling grease of suitable temperature rating, to the region of conduit wall between the two receiving transducers, or otherwise arranging to block, couple out or damp the wall-borne signal ahead of the second transducer, for example, by attaching a diverting or damping structure such as a coupling block with a distal reflecting face configured to intercept and divert the signal carried in the wall. Applicant refers to such a construction as a "peak absorber", because its function in the present invention is to remove or reduce energy that would otherwise present a distinct, but confounding, peak in the signal correlation. FIG. 4 shows the effect on signal correlation of such a peak absorber 25. As shown in that figure, the signal received without an intervening peak absorber produces a correlation curve $C_1$ having a prominent peak (correlation~0.95) substantially earlier than the true detection peak (correlation~0.99) from the tags in the fluid flowing past the second transducer. With a peak absorber on the conduit, the received signal presents a clear correlation curve $C_2$ having a single prominent peak due entirely to the fluid transit modulation.

Figure 5:
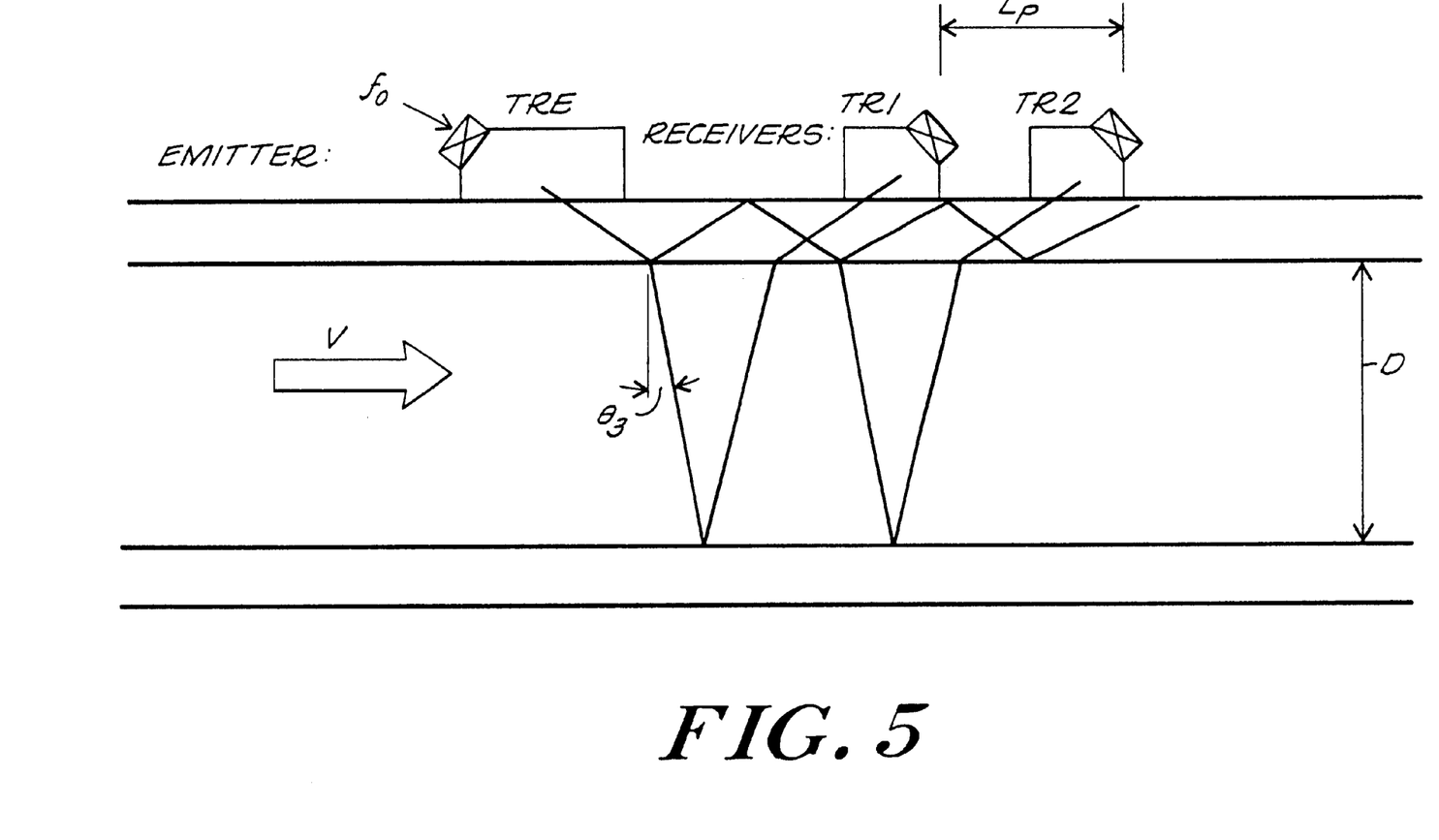
FIG. 5 illustrates a second embodiment of the invention.
Figure 6:
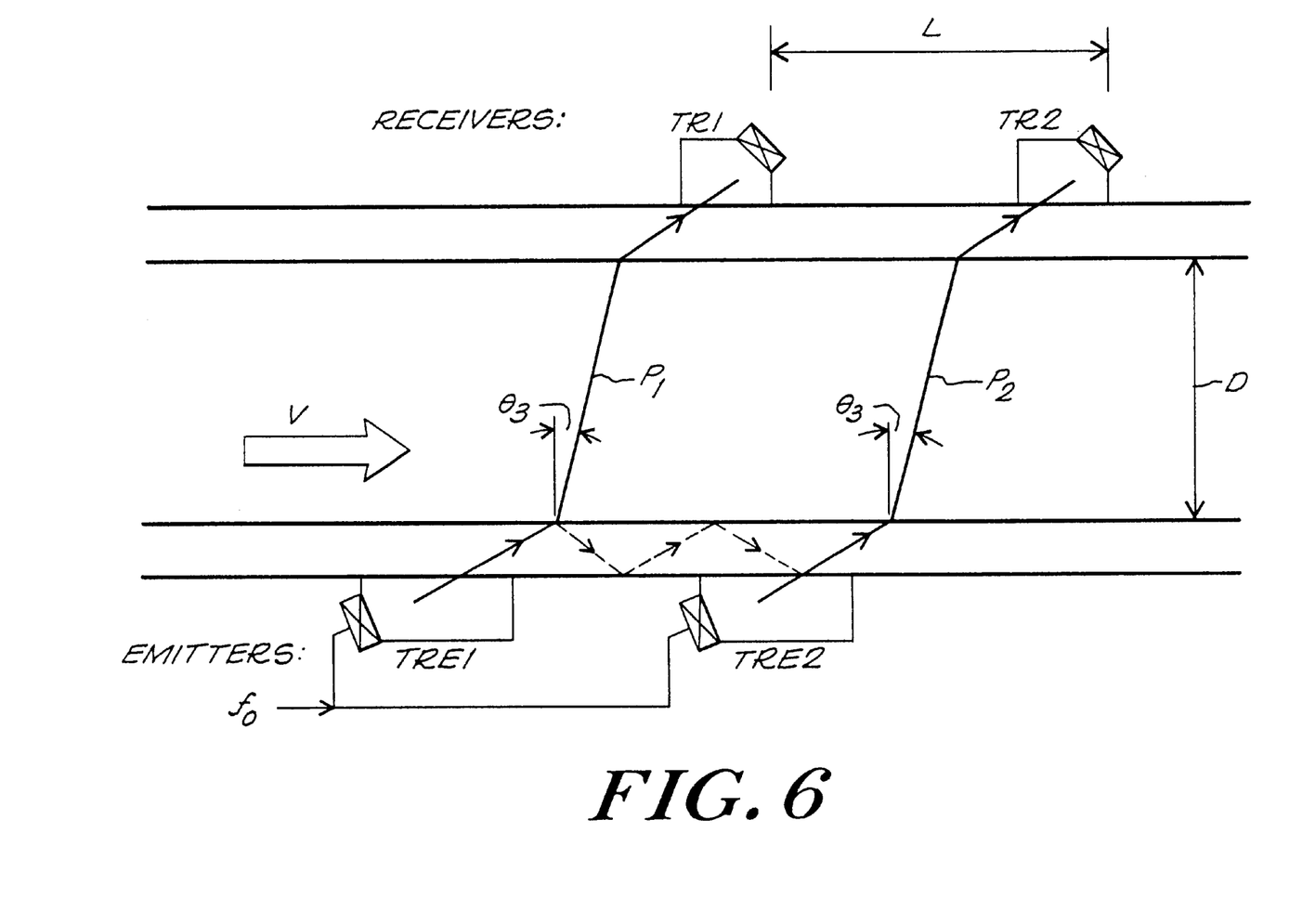
FIG. 6 illustrates a third embodiment of the invention.
Figure 7:
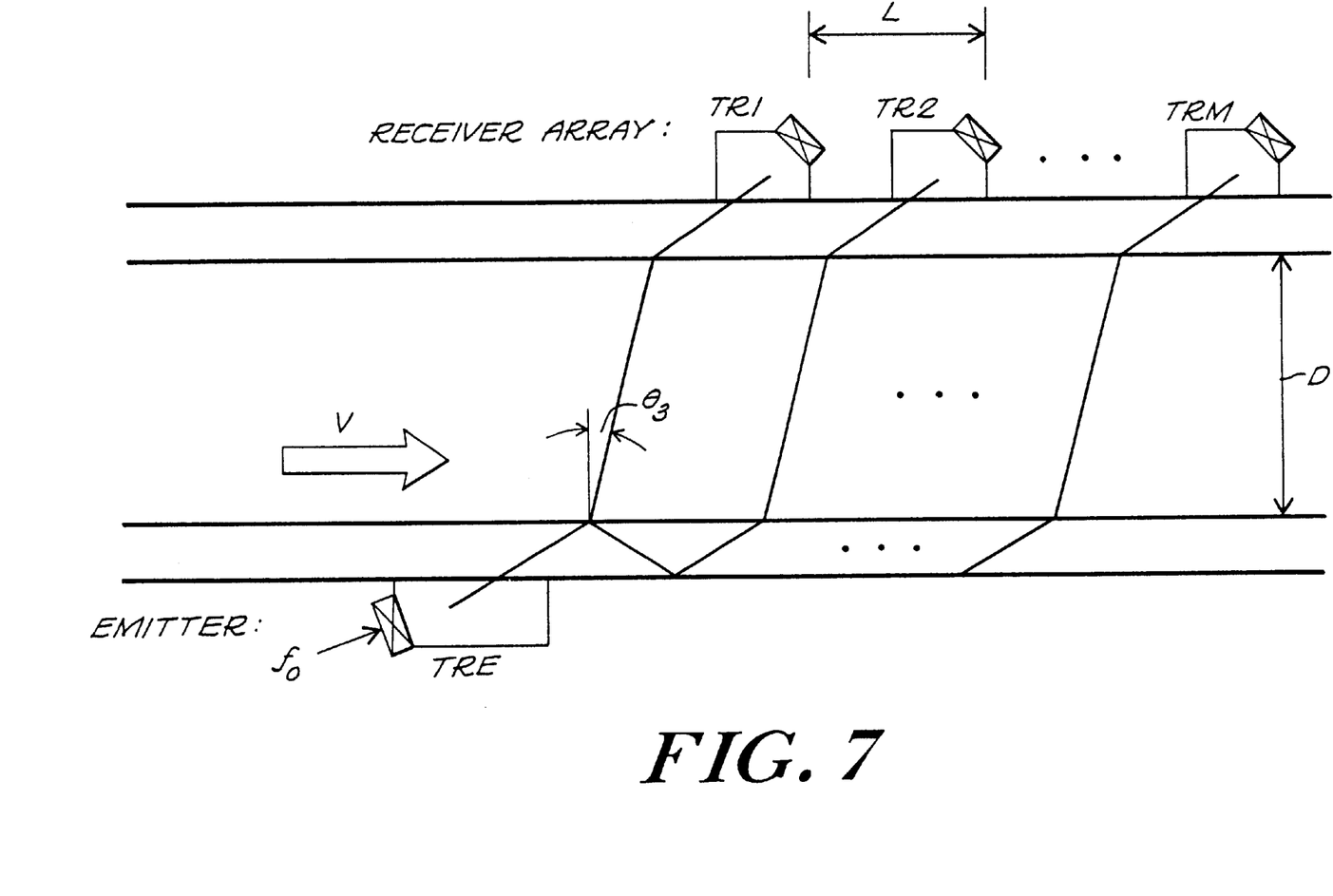
FIG. 7 illustrates a fourth embodiment of the invention.

FIGS. 5–7 show other embodiments of systems according to this first aspect of the invention, wherein the transmitted signals are of a single frequency $f_0$. As shown in FIG. 5, the enhanced signal definition of the system architecture may also advantageously be implemented in a system wherein the receiving and transmitting transducers are positioned on the same side of the conduit. In this case the fluid path has an even number of transits between transmission and reception, and hence an odd number of reflections. The receivers are spaced apart by one or more skip distances $L_p$, and are positioned to receive the bounced fluid signal. An absorber (not shown) may be positioned between the transmitter and receiver to reduce the signal in the wall, and the geometry may be further adjusted to position the receivers at nodes of the wall-borne transmission signal.

As shown in FIG. 6, the system may include a separate transmitting transducer directed across from the receivers; this produces a larger received signal in the second receiver, and may enhance the ultimate measurement in steam systems having large diameter conduits or excessive noise.

FIG. 7 illustrates a system having more than two receivers. The array of receivers provides a set of cross-correlation functions which improve the measurement reliability and the resonance time of the system. In this system, the signal processor may also select the receiving transducers whose signal is to be correlated based on programmed inputs and/or sensed conditions. Thus, for example it may select the first and third receivers so as to measure flow velocities that are twice those resolvable with the receivers at half that spacing, or when flow is slow but coherent, it may select a more widely spaced pair to double or triple its accuracy at the same flow rate. Similarly, it may select the most closely spaced pair when it determines that the "coherence length" of flow is too short to otherwise produce a dependable correlation, or a correlation having a suitably narrow peak width to be considered a meaningful flow measurement.

Figure 8:
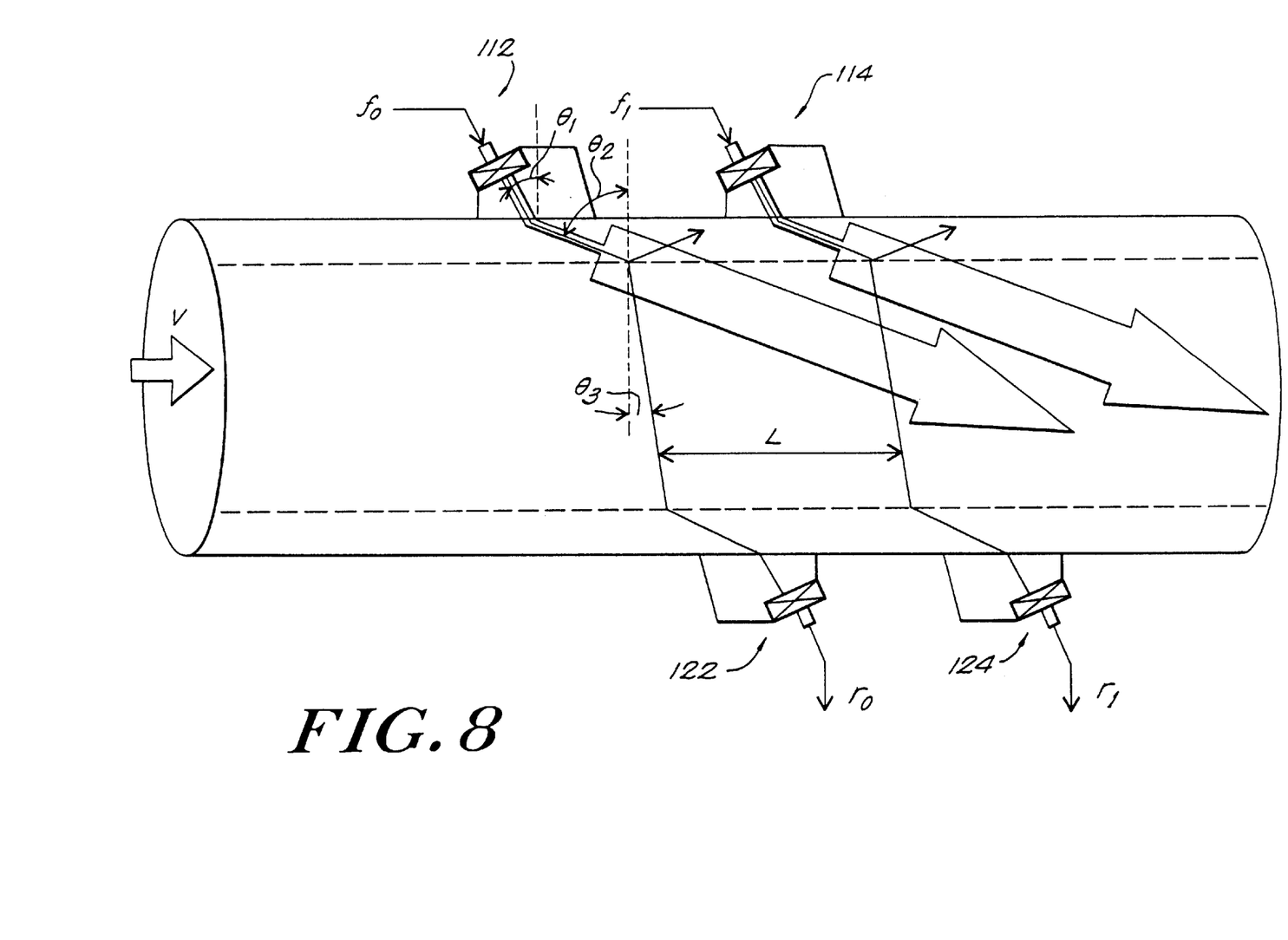
FIG. 8 illustrates an embodiment of a system according to a second aspect of the invention.

In accordance with a second aspect of the invention, the gas or steam measurement system of the present invention is implemented with a pair of transmitting transducers 112, 114 as shown in FIG. 8, that are opposed and positioned downstream to a corresponding pair of receiving transducers 122, 124. As before, each transmitting and receiving transducer is coupled to launch a shear wave at a relatively steep angle into the conduit wall, to couple a beam into the fluid at an angle $\theta_3$ across the conduit. Each pair of transducers 112, 114 and 122, 124 are spaced a distance L apart, and the distance L, typically between about one and three pipe diameters, is set to be short enough so that the discrete inhomogeneities in the fluid flow remain highly correlated over the length L.

Figure 9:
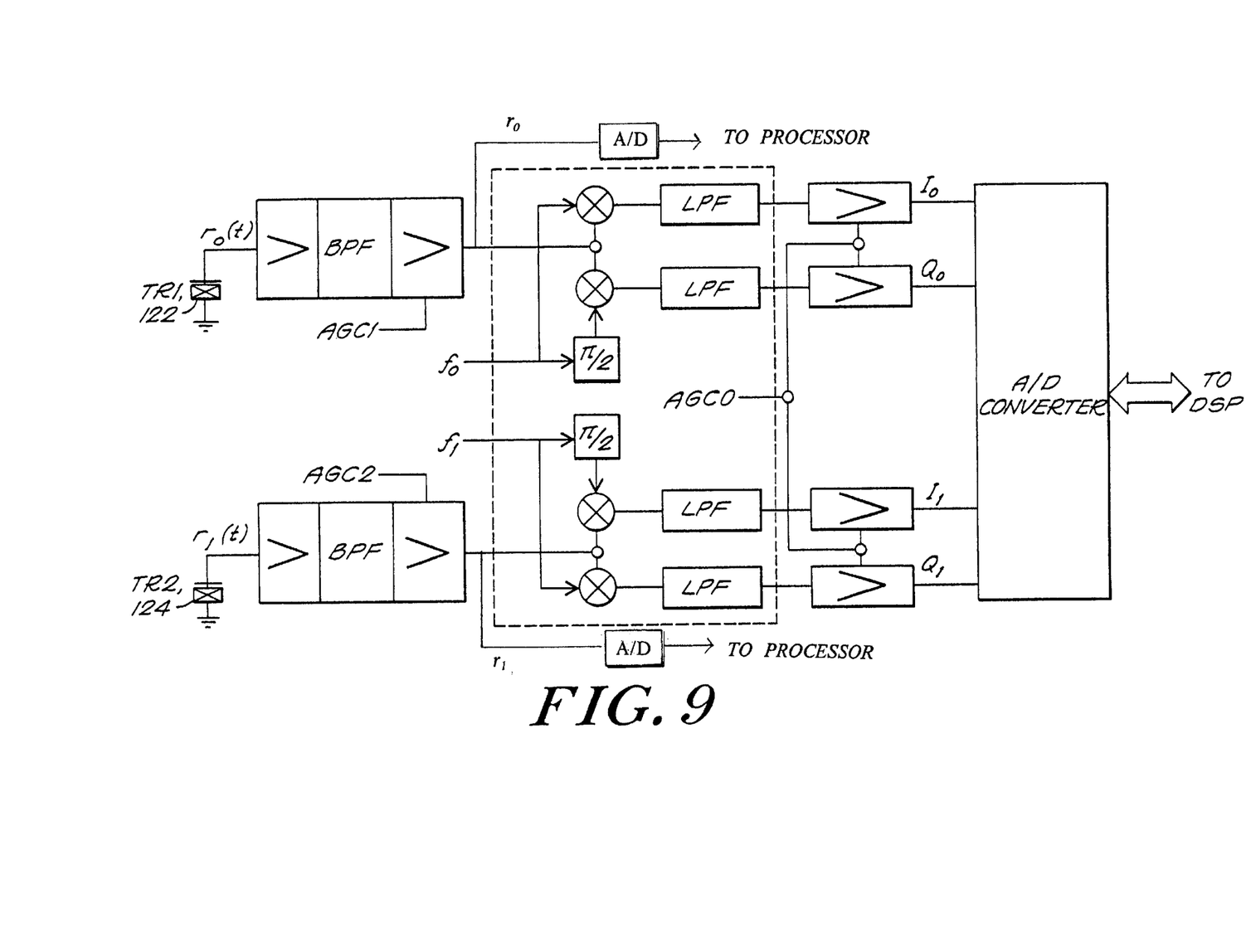
FIG. 9 illustrates representative processing, of the received signals in the embodiment of FIG. 8.

In accordance with this second aspect, the two transducers 112, 114 each emit at a different frequency $f_0$, $f_1$. As with the embodiments described above, the frequency is set sufficiently high so that the signal traveling through the flowing gas or steam is effectively modulated by the inhomogeneities or disturbances in the flow. The two frequencies are also set sufficiently close to each other that the modulation of both signals remains highly correlated. By way of example, the transducers may employ frequencies of 475 kHz and 500 kHz, or 450 kHz and 500 kHz, or 900 kHz and 1 MHz. As described further below, the separate frequencies permit the received signals to be separately demodulated, without relying on specialized filters, or on physical damping or isolation structures between receivers, to produce two distinct fluid path signals. The two receiving transducers 122, 124 produce receiver output signals $r_0(t)$, $r_1(t)$, respectively, which are separately quadrature demodulated at frequencies $f_0$, $f_1$ respectively as shown in FIG. 9. As shown therein, preferably the received signals are filtered and amplified before quadrature demodulation. The conditioned signal in each channel may also be low pass filtered and provided as a further input $r_0$, $r_1$ respectively to the A/D converter for various other forms of processing or correlation.

In general, it is desirable that each receiver 122, 124 be positioned several inches downstream of its corresponding transmitter 112 or 114, and further that its beam width alone the axial direction be less than that of the transmitters. By way of example, for frequencies near 500 kHz, the transmitter may emit along a 1.2" length, while the receiver may be configured to couple along a 1" length of the conduit, in each case using a shielded PZT crystal transducer of about 0.9" diameter and a plastic wedge at an angle designed to have a refracted angle of 70° in the pipe wall.

Figures 10A, 10B:
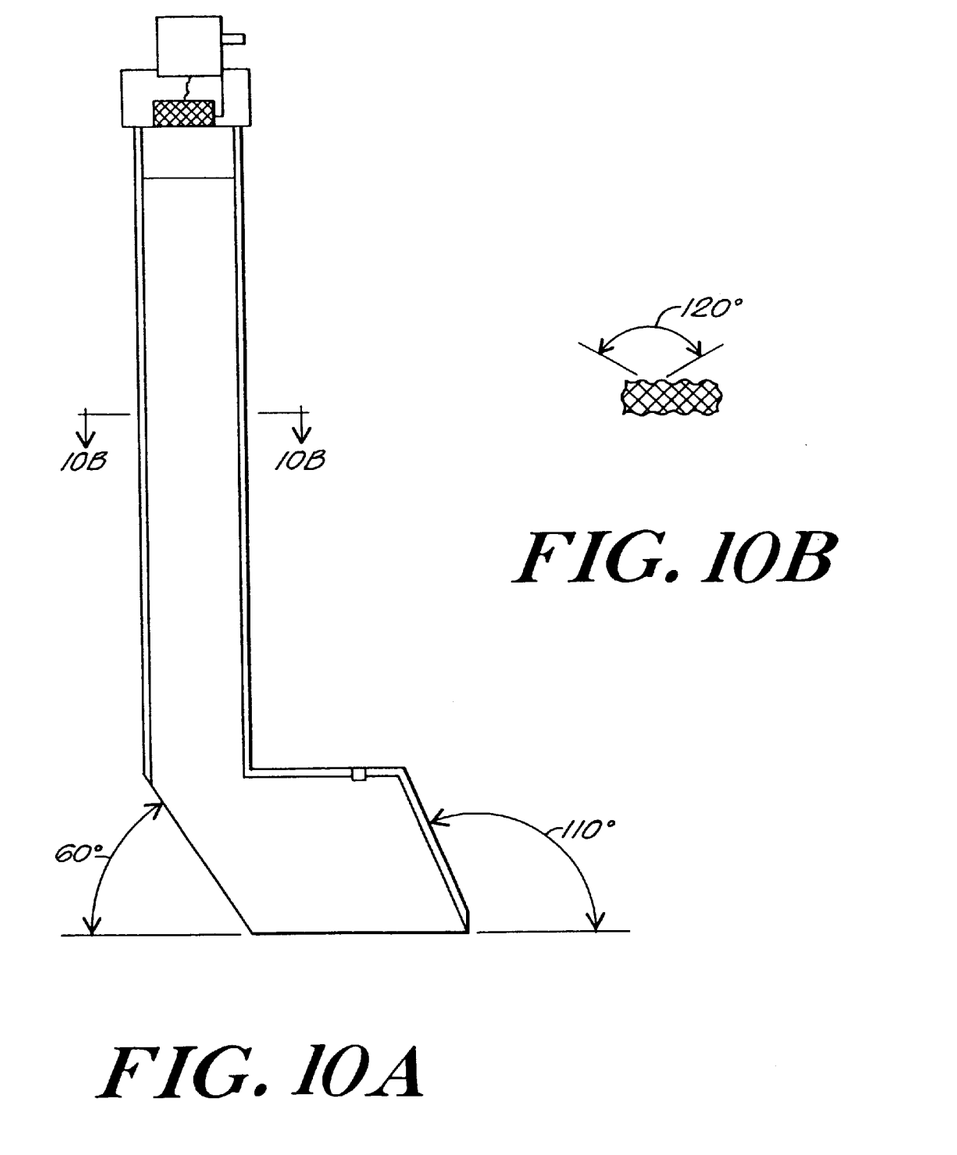
FIGS. 10A and 10B illustrate a buffer rod useful for high temperature implementations of any of the above embodiments.
Figure 11A:
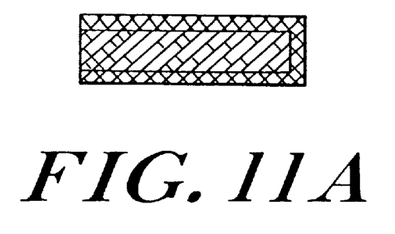
FIGS. 11A–11D illustrate a coupling shoe for enhancing performance of these systems.
Figure 11B:
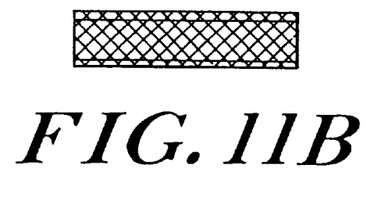
Figure 11C:
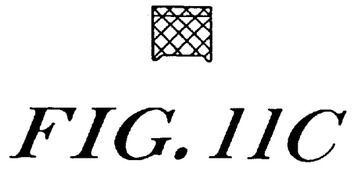
Figure 11D:
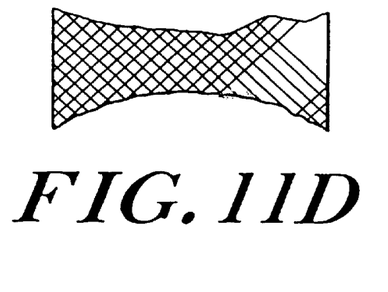

For high temperature steam, a buffer rod as shown in FIGS. 10a, 10b may be employed to isolate the transducer from the conduit heat. Although thicker, this rod is somewhat similar to those illustrated in U.S. patent application Ser. No. 08/879,690 filed Jun. 20, 1997. In this case, the side walls of the buffer assembly may be rippled or otherwise contoured or finished as shown in FIG. 10b to prevent ringing and mode conversion. The pipe-contacting end of the steel buffer rod may also be fitted with a shoe, shown in FIG. 11, which may be formed of a suitable polymer to achieve shear coupling at the desired launching angle. The shoe may further have a cylindrically recessed contact surface as shown in FIG. 11(d), to fit the curvature of the conduit wall and enhance the beam transmission or profile.

In general, the two-frequency embodiments of the invention will be seen to require two transmitters and two receivers. Preferably, damping material may be placed about the conduit both before the first transmitter and after the last receiver, to reduce the level of background noise entering from remote regions of the plant and conduit. The close spacing of the transducers, and the electronic signal processing separation of the two received signals essentially eliminates the need for any physical isolation or damping structures between the receivers. However, this embodiment is not readily extended to systems employing more than two receivers, and thus is not capable of adaptively increasing transducer spacing to enhance resolution where flow conditions would otherwise permit an increased spacing.

The single-frequency systems of the first aspect of the invention, on the other hand, readily permit the use of multiply-spaced receivers and adaptive application of different correlations to enhance the range or resolution of flow measurements.

Furthermore, a variation of the second aspect of the invention may also be so adapted. This system employs two transmitting transducers, and modulates the transmission signals of each transmitter differently in amplitude or phase at the two transmitting locations, for example employing a random or pseudo-random code sequence which differs for each transmitter. Signals are then received and demodulated separately at two receivers, using matched filtering or other means to extract the noise modulation caused by the moving fluid, and to reject the modulation of the signal introduced at the transmitter. The modulation at the two transmitters is selected from a suitable family of modulations designed to minimize the interference of one transmitter/receiver pair with the other transmitter/receiver pair. Further, this system may employ further receivers downstream, which are selectively used with suitable demodulation to receive the fluid born energy from one transmitter and to increase the effective spacing, and enhance the resolution or flow range as discussed above for the single-transmitter system.

The invention has been described above with respect to several distinct embodiments for the measurement of a fluid of low density or acoustic impedance. The various embodiments involve novel arrangements wherein the conduit and receiving transducers are configured to capture a signal of enhanced energy level and resolve flow velocity with dependable and effective resolution despite the conduit noise and low signal to noise ratio SNR which generally afflict such fluid systems. The invention thus enables one to measure several fluids which have been previously inaccessible to effective clamp-on measurement, including, for example, low pressure steam, flare gas, or even two-phase fluids. The invention being thus described, variations and modifications will occur to those skilled in the art, and all such variations and modifications are considered to be within the scope of the invention, as defined by the claims appended hereto and equivalents thereof.

What is claimed is:

1. An ultrasonic measurement system for measuring a fluid flow of a low density gas, steam or two-phase fluid in a conduit, the conduit having a conduit wall, said system comprising an ultrasonic signal transmitter which clamps to the conduit to launch an ultrasonic signal in the wall of the conduit a first receiving transducer and a second receiving transducer clamped to the conduit the ultrasonic signal transmitter being coupled to the wall to launch the ultrasonic signal such that said ultrasonic signal skips within the conduit wall with a characteristic skip distance $L_p$ coherently energizing a region of the wall such that ultrasonic signal energy effectively enters the fluid along spaced-apart paths obliquely crossing said flow and travels across the conduit being modulated by flowing inhomogeneities therein, said ultrasonic transmitter being mounted so as to create a shadow zone distinct from said coherently energized region the first receiving transducer and the second receiving transducer being spaced apart and positioned on said conduit in the shadow zone of the ultrasonic signal transmitter to receive signal energy from the ultrasonic signal that has been modulated in passing along different ones of said paths thereby producing respective first and second receiver output signals, and a processing system associated with the first receiving transducer and the second receiving transducer to correlate the first and second receiver output signals to determine a time delay indicative of flow velocity in the conduit.

2. The ultrasonic system of claim 1, wherein the ultrasonic signal transmitter launches said signal at a frequency $f_0$, and said processing system quadrature demodulates the receiver output signals at said frequency $f_0$.

3. The ultrasonic system of claim 1, further comprising a signal energy absorbing structure attached to the conduit between said first and said second receiving transducers.

4. The ultrasonic system of claim 1, further comprising more than two receiving transducers, and wherein the processing system selectively processes or combines different ones of the receiver output signals to enhance flow measurement range or accuracy.

5. The ultrasonic system of claim 1, wherein the signal transmitter launches a continuous wave signal of a frequency between about 100 kHz and 1 MHz.

6. The ultrasonic system of claim 1 further comprising a wedge or buffer, and wherein the ultrasonic signal transmitter couples to the conduit wall with said wedge or buffer so as to launch said signal at an angle in the conduit wall above about 70°.

7. The ultrasonic system of claim 1, further comprising another transmitter operating at a common frequency with said ultrasonic signal transmitter.

8. The ultrasonic system of claim 1, further comprising two separate transmitting transducers operating at two different frequencies $f_0, f_1$, and wherein the processing system demodulates each of the receiver output signals at a respective one of said frequencies.

9. The ultrasonic system of claim 1, comprising two separate transmitting transducers modulated to transmit signals with different codes, and wherein the processing system demodulates each of the receiver output signals to detect a fluid-modulated signal received along each of two different paths through the fluid.

10. The ultrasonic system of claim 9, wherein the processing system demodulates output signals from the first receiving transducer and the second receiving transducer with said different codes to separately detect said signals transmitted by the two transmitting transducers.

11. An ultrasonic measurement system for measuring gas or steam fluid flow in a conduit, said conduit having a wall and a longitudinal axis, said system comprising an ultrasonic signal transducer transmitting an ultrasonic energy output and coupled to the conduit wall so as to energize a region of the conduit wall with a shear wave such that said region acts as a spatially periodic emitter to preferentially launch an ultrasonic signal across fluid flow in the conduit at spaced apart locations and a defined oblique path angle across the longitudinal axis a first receiving transducer and a second receiving transducer clamped to the conduit and being spaced to receive said ultrasonic signal along different paths through the fluid flow and to produce signals indicative thereof wherein said ultrasonic signal received by each transducer is passively modulated by scatterers or inhomogeneities moving in the fluid flow as the signal traverses each of the different paths, and a processor associated with said first receiving transducer and with said second receiving transducer to correlate signals produced by said first receiving transducer and by said second receiving transducer to determine velocity of fluid flow between said different paths.

* * * * *